US011179715B2

United States Patent
Kudryavtsev et al.

(10) Patent No.: US 11,179,715 B2
(45) Date of Patent: Nov. 23, 2021

(54) INORGANIC ION-EXCHANGER FOR SELECTIVE EXTRACTION OF LITHIUM FROM LITHIUM-CONTAINING NATURAL AND INDUSTRIAL BRINES

(71) Applicants: Pavel Kudryavtsev, Haifa (IL); Nikolai Kudriavtsev, Haifa (IL); Iliya Kudryavtsev, Perm (RU)

(72) Inventors: Pavel Kudryavtsev, Haifa (IL); Nikolai Kudriavtsev, Haifa (IL); Iliya Kudryavtsev, Perm (RU)

(*) Notice: Subject to any disclaimer, the term of this patent is extended or adjusted under 35 U.S.C. 154(b) by 273 days.

(21) Appl. No.: 16/274,812

(22) Filed: Feb. 13, 2019

(65) Prior Publication Data

US 2020/0254437 A1    Aug. 13, 2020

(51) Int. Cl.
 *B01J 39/09*    (2017.01)
 *B01J 39/02*    (2006.01)

(52) U.S. Cl.
 CPC ............... *B01J 39/09* (2017.01); *B01J 39/02* (2013.01)

(58) Field of Classification Search
 None
 See application file for complete search history.

(56) References Cited

U.S. PATENT DOCUMENTS

| 7,943,113 | B2 | 5/2011 | Chung et al. | |
| 8,753,594 | B1 | 6/2014 | Burba, III et al. | |
| 8,926,874 | B2 | 1/2015 | Chung et al. | |
| 9,764,318 | B2 | 9/2017 | Harrison et al. | |
| 10,434,497 | B2 * | 10/2019 | Kudryavtsev | B01J 20/0214 |
| 2019/0184373 | A1 * | 6/2019 | Kudryavtsev | B01J 20/3078 |

OTHER PUBLICATIONS

Transactions of Higher-Education Institutions (Izvestiya Vuzov) "Non-ferrous Metallurgy" (Tsvetnaya metallurgya), 1977, No. 3, pp. 50-53, P. Kudryavtsev, et al.

* cited by examiner

*Primary Examiner* — Joseph D Anthony

(57) ABSTRACT

Proposed is an inorganic ion-exchanger, which is selective to lithium and constituted a non-stoichiometric compound in the form of solid particles of a polymeric aqua-oxo-hydroxo complex represented by the following general formula: $H_aNbO_{(2.5+0.5 \cdot a)} \cdot cZrO_2 \cdot dH_2O$, wherein: "a" is a number ranging from 0.5 to 1.5, "c" is a number ranging from 0.01 to 1.0, and "d" is a number ranging from 0.1 to 2.0. The complex has a total ion exchange capacity of at least 3.5 meq/g and an ion-exchange capacity specifically to lithium of at least 2.5 meq/g. This ion-exchanger is intended for selective extraction of lithium from lithium-containing natural and industrial brines.

15 Claims, 2 Drawing Sheets

INORGANIC ION-EXCHANGER FOR SELECTIVE EXTRACTION OF LITHIUM FROM LITHIUM-CONTAINING NATURAL AND INDUSTRIAL BRINES

FIELD OF THE INVENTION

The invention relates to the field of chemical technology, namely, to the production of selective inorganic sorbents for the extraction of lithium from lithium-containing natural and technological brines and can be used in the extraction of lithium from alkaline and slightly alkaline solutions with a high content of sodium ions and ions of other metals. In particular, the invention relates to an inorganic ion-exchanger for selective extraction of lithium from lithium-containing natural and industrial brines.

DESCRIPTION OF THE PRIOR ART

Lithium is historically extracted from two different sources—continental brines and minerals of hard rocks. At the present time, lithium finds use in the production of glass, ceramics, medical substances, metallurgical products, as well as in such fields as nuclear energy, aviation, etc. Demand for lithium will certainly grow when vehicles become greener, and electricity becomes cleaner. World sales of lithium salts currently amount more than $1 billion a year, because this element becomes an important component of lithium-ion batteries, which now feed everything from electric cars to power tools and smartphones.

According to forecasts, over the next eight years the demand for lithium will increase by more than 300%. Nevertheless, whenever larger electric companies expand the power of solar energy, demanding the storage of high-density energy Li-ion batteries, the demand for lithium can skyrocket. As an example, Duke Energy (one of the world leaders in production of energy) currently stopped the proposed nuclear power plant in Florida and instead plans to invest in a $6 billion solar and battery infrastructures. The ever-increasing demand for batteries and the need to store high-density energy created an acute dependence of many industries of the world industry on lithium, which triggered a global search for new lithium sources.

Sorbents for lithium extraction and methods of their preparation are known in the art and are described in the patent and technical literature.

For example, U.S. Pat. No. 8,753,594 issued on Jun. 17, 2014 to Burba, III, et al. discloses a composition for recovery of lithium from a brine comprising a particulate material in the form a lithium aluminate intercalate and a polymer. The lithium aluminate intercalate is produced by infusing alumina with a lithium salt to produce a $LiX.Al(OH)_3$ solid having a mole ratio of lithium to alumina of up to about 0.33, wherein X is the anion of the lithium salt. The lithium aluminate intercalate is present in an amount of at least about 80% by weight and the polymer is present in an amount of between about 1% and 20% by weight, and the polymer is not an ion-exchange resin. The lithium salt is lithium chloride.

U.S. Pat. No. 9,764,318 issue on Sep. 19, 2017 to Stephen Harrison, et al. discloses a method for preparing a sorbent composition that includes an intercalate material that includes lithium and a three-dimensionally structured (porous) activated aluminum material for use in the removal and recovery of lithium from solutions, particularly lithium salts from geothermal and other brines. The described sorbent composition provides controllable lithium to aluminum ratio, and a structural form of particulate media. In certain embodiments, the activated alumina lithium intercalate sorbent composition has a mole fraction of lithium to aluminum in the range of about 0.1 to 0.3, and preferably up to about 0.33. The ratio of lithium to alumina is critical in stabilizing the structural form of the material and maximizing the number of lithium sites available in the matrix for the loading and unloading of lithium from a brine solution.

U.S. Pat. No. 7,943,113 issued on May 17, 2011 to Kang-Sup Chung, et al. discloses a Lithium-manganese oxides and lithium adsorbent using the same. The lithium-manganese oxides is expressed by the following chemical formula: $Li_{1+x}Mn_{1-x-y}M_yO_{2+z}$, wherein $0.01 \le x \le 0.5$, $0 \le y \le 0.3$, $-0.2 \le z \le 0.2$, and M is a metal selected from the group consisting of Ti, Mn, V, Cr, Fe, Co, Ni, Cu, Zn, Zr, Nb, Mo, W, Ag, Sn, Ge, Si, Al, and alloy thereof.

U.S. Pat. No. 8,926,874 issued on Jan. 6, 2015 to Kang-Sup Chung, et al. discloses a high-performance porous lithium adsorbent molded body. The proposed method makes it possible to obtain an adsorb selective to lithium ions by an ion-exchange method. The method allows to control the size and density of the pores, which are formed on the inside and outside of the molded body, by controlling the heat treatment time and conditions, if necessary.

In Transactions of Higher-Education Institutions (Izvestiya Vuzov) "Non-ferrous Metallurgy" (Tsvetnaya metallurgiya), 1977, No. 3, pp. 50-53, P. Kudryavtsev, et al. disclose an inorganic ion-exchanger ISN-1 selective to ions of lithium. What is disclosed in this publication, is a method of obtaining an inorganic sorbent for extracting lithium from natural and technological brines. The method involves contacting the soluble niobates (V) with an acid, granulating the resulting precipitate, transferring the obtained product to calcining at an elevated temperature, and then converting the product into an H-form.

SUMMARY OF THE INVENTION

Figure 1:
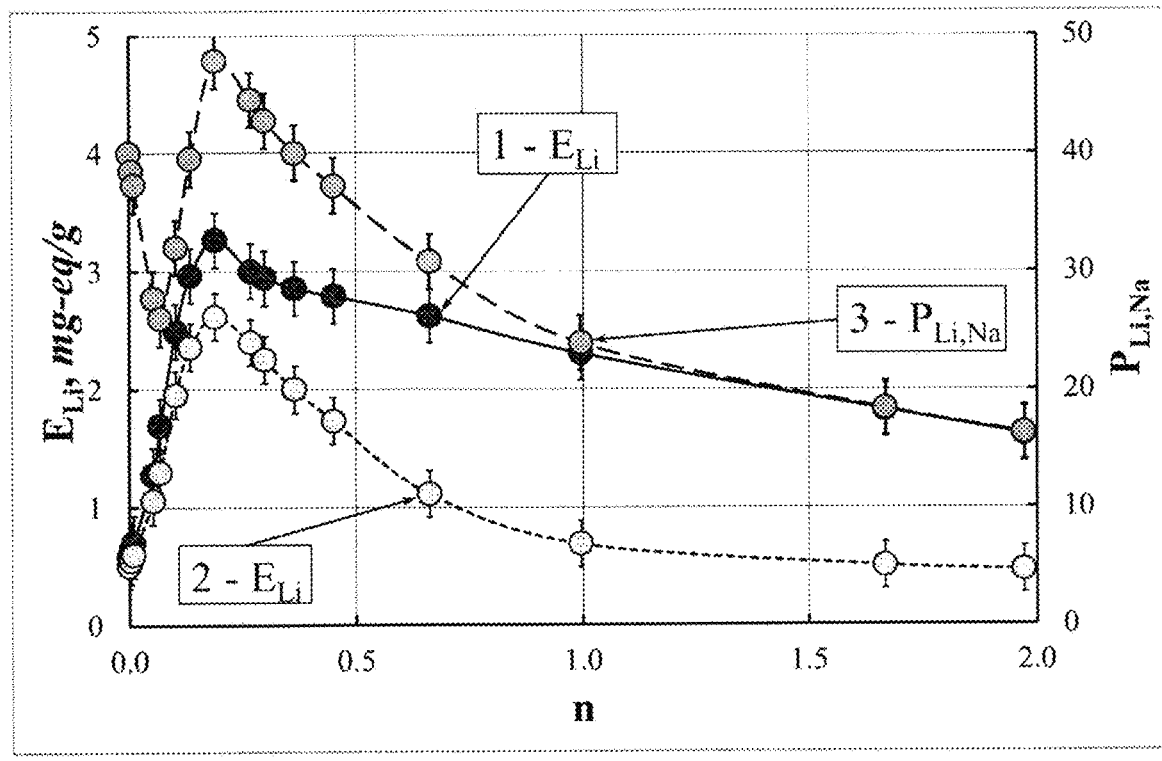
FIG. 1 is a graph that shows dependence of the capacitance on lithium ($E_{Li}$) and an effect of the ion separation factor in lithium and sodium ($P_{Li,Na}$) on the content in the sorbent of zirconium ions.

The invention relates to the field of chemical technology, namely, to the production of selective inorganic sorbents for the extraction of lithium from natural and technological brines. The invention may be used in the extraction of lithium from alkaline and slightly alkaline solutions with a high content of sodium ions and ions of other metals. In particular, the invention relates to an inorganic ion-exchanger for selective extraction of lithium from lithium-containing natural and industrial brines.

The term "brines" used in the context of the present patent specification covers any natural or technological solutions that contain lithium.

Ion exchanger, which are also known as ionic sieves, are inorganic ion-exchange sorbents that exhibit the so-called ion-sieve effect, which is the effect of separation of ions in a solution in accordance with the difference in their ionic radii. Dimensions of ionic positions in the crystal structures of the material correspond to certain ions, and ions of a larger size cannot enter unspecified positions. A unique feature of the ion-exchanger of the invention is its specific structure that provides high selectivity especially to lithium ions.

It is also important to note that in the context of the present specification the term "mixed hydrated niobium and zirconium oxide" does not mean a mechanical mixture of the hydrated niobium oxide with a hydrated zirconium oxide but rather means a chemical compound of a non-stoichiometric composition.

The objective of the invention is to provide an ion-exchanger selective to lithium. Such an ion-exchanger is intended for use in processes of extraction of lithium from natural and technological brines.

An inorganic ion-exchanger of the present invention is a chemical non-stoichiometric compound, which constitutes an inorganic polymeric aqua-oxohydroxo complex intended for selective extraction of lithium from lithium-containing natural and industrial brines and represented by the following general formula:

$$H_aNbO_{(2.5+0.5 \cdot a)} \cdot cZrO_2 \cdot dH_2O,$$

wherein:
"a" is a number ranging from 0.5 to 1.5,
"c" is a number ranging from 0.01 to 1.0
"d" is a number ranging from 0.1 to 2.0

For use in lithium-extraction process, it is preferable to have the inorganic ion-exchanger of the invention in the form of solid particles with dimensions ranging from 0.1 to 2.0 mm. The aforementioned inorganic polymeric aqua-oxohydroxo complex is complex of niobium and zirconium. It is a mixed polynuclear complex that has a total ion exchange capacity of at least 3.5 meq/g and an Ion-exchange capacity specifically to lithium of at least 2.5 meq/g, where meq stands for milligram equivalent.

As mentioned above, the known method of P. Kudryavtsev, et al. involves contacting a soluble niobate (V) solution with an acid to form a precipitate, which is comprised of a mixed hydrated niobium and zirconium oxide. The obtained product is frozen and then defrosted for obtaining a granulated mixed hydrated niobium and zirconium oxide. The following steps include subsequent transfer of the material to washing with a solution of lithium carbonate, calcining the granulated mixed hydrated niobium and zirconium oxide to obtain a granulated mixed lithium, niobium, and zirconium oxide, and transferring the finished product to an H-form by washing with the solution of the acid. The method of the invention differs from the aforementioned conventional method by conducting a reaction of niobates (V) with an acid in the presence of zirconium (IV) salts and at a ratio of niobium (V) to zirconium (IV) in a solution in the range of 1:(0.1 to 0.7). The obtained lithium-form material is calcinated at a temperature in the range of 450° C. to 600° C., and the finished product is then treated with an acid solution, e.g., a nitric acid solution, whereby a target product, i.e., a hydrogen-form sorbent is obtained. Primary area of use: extraction of lithium from complex natural and technological brines including those, which contain oxidants and reducing agents, as well as radioactive elements.

DETAILED DESCRIPTION OF THE INVENTION

The invention relates to the field of chemical technology, namely, to the production of selective inorganic sorbents for the extraction of lithium from natural and technological brines. The invention may be used in the extraction of lithium from alkaline and slightly alkaline solutions with a high content of sodium ions and ions of other metals. In particular, the invention relates to an inorganic ion-exchanger for selective extraction of lithium from lithium-containing natural and industrial brines.

The term "brines" used in the context of the present patent specification covers any natural or technological solutions that contain lithium.

Ion exchanger, which are also known as ionic sieves, are inorganic ion-exchange sorbents that exhibit the so-called ion-sieve effect, which is the effect of separation of ions in a solution in accordance with the difference in their ionic radii. Dimensions of ionic positions in the crystal structure of the material correspond to certain ions, and ions of a larger size cannot enter unspecified positions. A unique feature of the ion-exchanger of the invention is its specific structure that provides high selectivity especially to lithium ions.

It is also important to note that in the context of the present specification the term "mixed hydrated niobium and zirconium oxide" does not mean a mechanical mixture of the hydrated niobium oxide with a hydrated zirconium oxide but rather means a chemical compound of a non-stoichiometric composition.

The objective of the invention is to provide an ion-exchanger selective to lithium. Such an ion-exchanger is intended for use in processes of extraction of lithium from natural and technological brines.

An inorganic ion-exchanger of the present invention is a chemical non-stoichiometric compound, which constitutes an inorganic polymeric aqua-oxohydroxo complex intended for selective extraction of lithium from lithium-containing natural and industrial brines and represented by the following general formula:

$$H_aNbO_{(2.5+0.5 \cdot a)} \cdot cZrO_2 \cdot dH_2O,$$

wherein:
"a" is a number ranging from 0.5 to 1.5,
"c" is a number ranging from 0.01 to 1.0
"d" is a number ranging from 0.1 to 2.0

If the value of "a" is less than 0.5, the ion-exchange capacity of the sorbent will decrease and this, in turn, will decrease the sorbent efficiency. On the value of "a" exceeding 1.5, will increase solubility of the sorbent and thus will increase the loss of the sorbent in a multiple-cycle process of sorption-desorption.

If the value of "c" is less than 0.01, this will lead to decrease of the sorbent ion-exchange capacity and of the sorbent efficiency. The same result will take place if the value of "c" exceeds 1.0.

If the value of "d" is less than 0.1, this will decrease the ion-exchange capacity of the sorbent and thus reduce its performance efficiency. On the other hand, if the value of "d" exceeds 2.0, this will increase solubility of the sorbent and thus will increase the loss of the sorbent in a multiple-cycle process of sorption-desorption (see data in the tables below).

For use in lithium-extraction process, it is preferable to have the inorganic ion-exchanger of the invention in the form of solid particles with dimensions ranging from 0.1 to 2.0 mm.

Furthermore, with the size of particles less than 0.1 mm, it will be difficult to handle the sorbent in ion-exchange columns because of passage of the particles into the lower part of the column through the cells of the filtering partitions. If, on the other hand, the size of particles exceeding 2.0 mm will delay the ion-exchange rate because of diffusion retardation of the ion-exchange process that occurs in the sorbent particles.

The aforementioned inorganic polymeric aqua-oxohydroxo complex is a complex of niobium and zirconium. It is a mixed polynuclear complex that has a total ion exchange capacity of at least 3.5 meq/g and an ion-exchange capacity specifically to lithium of at least 2.5 meq/g.

For better understanding the present invention, it would advantageous first to consider herein a method of manufacturing of the proposed ion-exchanger as is described in our co-pending U.S. patent application Ser. No. 15/841,760 filed on Dec. 14, 2017.

The method consists of contacting soluble niobates (V) with an acid in the presence of zirconium (IV) salts at an atomic niobium/zirconium ratio in the range of 1:(0.1 to 0.7) to obtain a mixed hydrated niobium and zirconium oxide, which is then granulated and subsequently converted into a lithium-form sorbent (hereinafter referred to as a sorbent). The granulation is carried out by freezing the obtained precipitate at a temperature of −5 to −7° C. for 24 to 30 hours with subsequent defreezing.

This conversion is carried out by treating the obtained product with a lithium-containing compound selected from the group consisting of a solution of lithium hydroxide LiOH and a solution of lithium carbonate $Li_2CO_3$. As a result, a Li-form of a granulated mixed hydrated niobium and zirconium oxide is obtained.

The obtained Li-form is calcined at an elevated temperature, specifically at 450÷600° C., the finished product is then treated with an acid solution, e.g., a nitric acid solution, to obtain a target product, i.e., a hydrogen-form sorbent (hereinafter referred to as an H-form sorbent).

Soluble niobates suitable for use in the method of the invention are represented by alkali metal orthoniobates, such as $Li_3NbO_4$, $Na_3NbO_4$, $K_3NbO_4$, $Rb_3NbO_4$, $Cs_3NbO_4$.

Zirconium salts suitable for the method of the invention can be exemplified by $ZrCl_4$, $ZrBr_4$, $ZrI_4$, $ZrOCl_2$, $ZrOI_2$, $Zr(SO_4)_2$, $Zr(NO_3)_4$.

Examples of H-form sorbents are given below in Table 1 (the Li-forms are similar and therefore are not included).

Uniqueness of the proposed method lies in the fact that the step of contacting a soluble niobate (V) with an acid is carried out in the presence of zirconium (IV) salts and in that the ionic ratio of niobium (V) to zirconium (IV) in their interaction ranges from 1 to (0.1÷0.7). Another feature is that calcination of the precipitate in the Li form is carried out at a temperature in the range of 450 to 600° C.

An optimal ratio between niobium and zirconium in the material is chosen on the basis of the experimental data obtained in studying the dependence of the exchange capacitance of the sorbent on lithium and the separation coefficient for lithium and sodium ions on the content of zirconium ions in the sorbent (FIG. 1).

FIG. 1 shows dependence of the capacitance on lithium ($E_{Li}$) and the separation factor for the ion in lithium and sodium ($P_{Li,Na}$) on the content in the sorbent of zirconium ions, where n=Zr(IV):Nb(V) is the ionic ratio in the sorbent. In this drawing, curve 1 corresponds to $E_{Li}$ obtained with the use of 0.1 N LiOH. Curve 2 corresponds to $E_{Li}$ obtained with the use of a solution of lithium and sodium salts at ionic ratio $Li^+:Na^+$=1:10, pH=12. Curve 3 corresponds to $P_{Li,Na}$ obtained with the use of a solution of lithium and sodium salts at ionic ratio $Li^+:Na^+$=1:10, pH=12. The calcination temperature of the samples is 520° C.

The obtained data shown in FIG. 1 indicate that the maximum value of the exchange capacity and selectivity to lithium ions is exhibited by materials whose composition corresponds to the ratio of niobium to zirconium in the range of 1 to (0.1 to 0.7).

To obtain such a composition, it is necessary to keep the ratio of the hydrated niobium oxide to the hydrated zirconium oxide in the solution the same as prior to mixing. In other words, the entire contents of the niobium and zirconium should transfer to a solid state contained in the precipitate.

Figure 2:
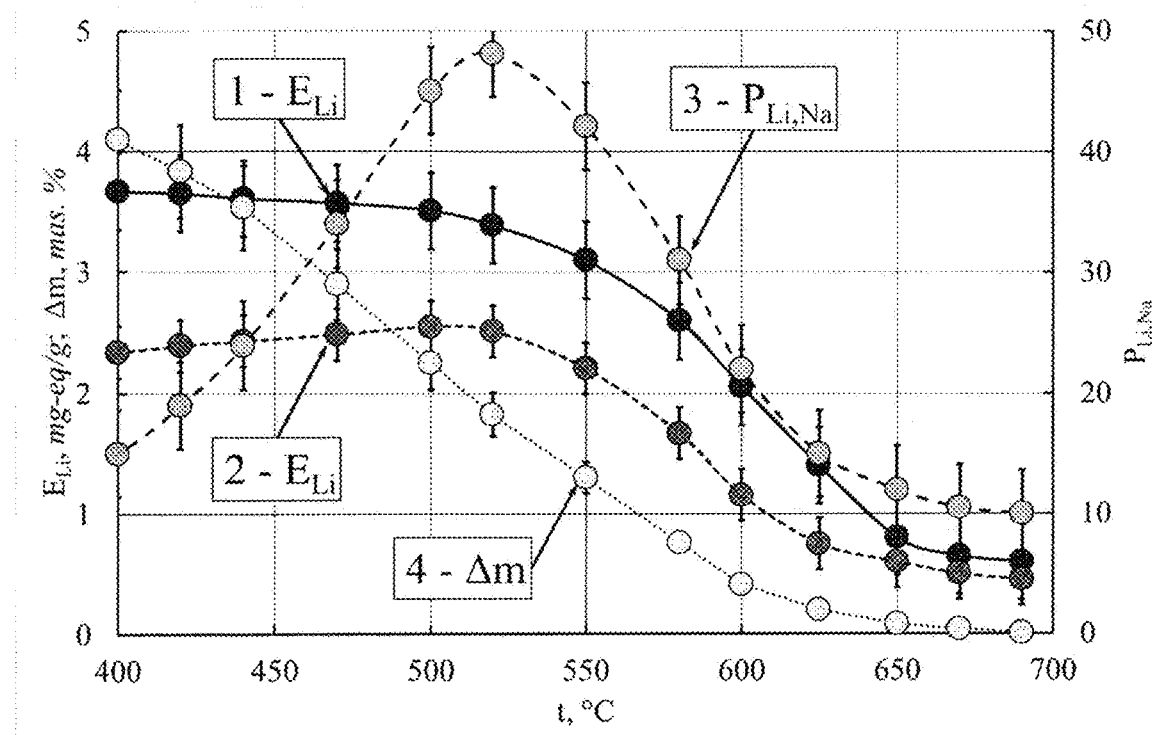
FIG. 2 is a graph illustrating the influence of the heat treatment temperature in the synthesis of the material, on the sorption-selective properties and the chemical stability of the sorption materials obtained.

The optimal conditions needed for heat treatment of the obtained granular material saturated with lithium ions were determined from the experimental data relating to sorption properties of sorbent samples prepared with a Zr(IV) to Nb(V) ratio equal in the solid phase to 0.30:1. The samples were calcined at different temperatures. The results are shown in FIG. 2, which illustrates the influence of the heat treatment temperature in the synthesis of the material on the sorption-selective properties and the chemical stability of the sorption materials obtained.

In the drawing, curve 1 corresponds to $E_{Li}$ obtained with the use of 0.1 N LiOH; curve 2 corresponds to $E_{Li}$ obtained with the use of a solution of lithium and sodium salts at ionic ratio $Li^+:Na^+$=1:10, pH=12; curve 3 corresponds to $P_{Li,Na}$ obtained with the use of a solution of lithium and sodium salts at ionic ratio $Li^+:Na^+$=1:10, pH=12; and curve 4 shows sorbent losses (Δm) per 1 work cycle in a solution of lithium and sodium salts at the ionic ratio $Li^+:Na^+$=1:10, pH=12.

The results of the experiments show that the optimum temperature for calcining the Li-form of the granulated mixed hydrated niobium and zirconium oxide to obtain a granulated mixed lithium, niobium, and zirconium oxide (i.e., a tripled mixed oxide, which is a Li-form of an inorganic ion exchanger) is in the range of 450° C. to 600° C. A time needed to keep the material at this temperature for the formation of the sorbent structure should be in the range of 2 to 3 hours. If heat treatment is carried out under these conditions, the obtained sorbent, which in this case possesses the ion-sieve effect, acquires a maximum exchange capacity and selectivity to lithium ions and is characterized by minimal losses in alternating sorption-desorption cycles.

The remaining operations of the proposed method for obtaining the granulated sorbent on the basis of precipitate of a mixed hydrated niobium and zirconium oxide and saturating the granulated material with lithium were carried out under the same conditions as in the method disclosed in the aforementioned article of P. Kudryavtsev, et al. More specifically, the cation exchanger ISN-1 was prepared by precipitation of hydrated niobium pentoxide (GPN) by mixing 0.1 M solutions of potassium niobate and hydrochloric acid, granulating the GPN, saturating the granular product with lithium ions from 0.05÷0.1 M solution of lithium carbonate, and then calcinating the product at 400±25° C. for 2÷3 hours. After calcination and conversion to the H-form (treatment with 0.1-0.2 M nitric acid solution), the sorbent was ready for lithium sorption. The obtained sorbent was suitable for extracting lithium from slightly alkaline solutions in the presence of both oxidizing agents and reducing agents.

The effectiveness of the proposed method is illustrated by the examples given below. It is understood, however, that these examples should not be construed as limiting the scope of the invention and that they are given only for illustrative purposes.

The following methods and instruments were used for processing the materials and measuring properties of the obtained products mentioned in the subsequent examples.

Equipment and Procedures Used in the Method of the Invention

Ion-Exchange Column

As ion-exchange column used in the method of the invention was a standard chromatographic column with a diameter of up to 10 mm. The height of the sorbent layer was maintained in the range of 10 to 15 column diameters. The solution was fed through the column at a constant linear speed, in the range of 1 to 10 mm/s. The feed rate of the solution was maintained by means of a peristaltic pump. During sorption experiments, special measures were taken to prevent air from entering the sorbent layer and to partially dry the sorbent granules.

Determination of the Content of Lithium

Determination of lithium in solutions was carried out by the method of emission photometry of a flame. The most intense resonance line in the spectrum of lithium, 670.8 nm, was used for the analysis. This line corresponds to the transition between the energy levels $2^2S_{1/2}$ and $2^2P^0_{3/2}$ at the excitation energy of 1.85 eV. The sensitivity of the method, in determining lithium (with the use of the FLAME PHOTOMETER, FP8000 series device; A. KRÜSS Optronic), was 0.001-0.0005 μg Li/ml. The content of lithium was determined from the calibration based on reference solutions prepared based on pure metal salts and their mixtures present in the solutions under study, which were close in proportion to the test solutions. Determination of sodium content was carried out in a similar way.

Determination of the Content of Zirconium

Determination of the content of zirconium and niobium in the composition of the investigated sorbent samples was carried out by X-ray fluorescence spectroscopy. The experiments were performed on a VRA-30 spectrometer. The source of excitation was a tube with a tungsten anode, operating at U=30 kV, I=15 mA. A LiF single crystal was used as the analyzer crystal. The registration was carried out using a proportional counter.

The Determination of the Content of Niobium

The determination of the content of niobium was carried out along the line $K_{\alpha_{1,2}}$, the sensitivity of the method was 0.05%. Determination of the zirconium content was carried out along the line $K_{\alpha_1}$, the sensitivity of the method was 0.003%. The background in the analysis was taken into account by the method of linear interpolation and by using a blank sample. Samples of materials for X-ray fluorescence analysis were prepared by compressing them in the form of tablets with NaCl(S7653 SIGMA-ALDRICH≥99.5% (AT)) at a pressure of 4000 kg/cm². The instrument was calibrated using samples containing fixed amounts of niobium pentoxide (203920 ALDRICH 99.99% trace metals basis) and zirconium dioxide (230693 ALDRICH 99% trace metals basis).

Sorption-Selective Parameters

The following characteristics are taken as parameters describing sorption-selective properties: a total exchange capacitance $E_{LiO}$, obtained by using 0.1 N LiOH solution as a sorbent; a selective lithium capacitance $El_{i1}$ used for sorption from a solution of lithium and sodium salts at an ionic ratio Li$^+$:Na$^+$ in the range of 1 to 10 at pH=12; and a coefficient $P_{Li,Na}$ of selectivity of the sorbent with respect to lithium, which is a direct parameter that characterizes separation of lithium from sodium and which is represented by the following formula:

$$P_{Li,Na} = \frac{E_{Li1} \cdot C_{Na}}{E_{Na1} \cdot C_{Li}},$$

where $E_{Li1}$ is a selective lithium capacity at sorption from a solution of lithium and sodium salts at ionic ratio Li$^+$/Na$^+$ of 1/10 at pH=12 (mg-eqv/g sorb.);

$E_{Na1}$ is a sodium capacity at sorption from a solution of lithium and sodium salts at ionic ratio Li$^+$/Na$^+$ of 1/10 at pH=12 (mg-eqv/g sorb.);

$C_{Li}$ is a molar concentration of Li$^+$ in a solution of lithium and sodium salts at ionic ratio Li$^+$/Na$^+$ of 1/10 at pH=12 (mol/l);

$C_{Na}$—molar concentration of Na$^+$ in a solution of lithium and sodium salts at ionic ratio Li$^+$/Na$^+$ of 1/10, pH=12 (mol/l).

EXAMPLES

Example 1

A predetermined amount of 0.05 M solution ZrOCl$_2$ in 1.0 M HCl is poured to 2.0 l of a 0.05 M solution of K$_3$NbO$_4$ (pH=12.7) with a vigorous stirring. The pH of the precipitation process is 5 to 6 (correction with HCl). The resulting precipitate of a mixed hydrated niobium and zirconium oxide is washed by successive decantation's to a residual concentration of potassium ions equal to 0.08-0.09 g/l and then frozen at t=−6 C for about 30 hours. The freezing produces a granulated material. After thawing, the granulate is placed in an ion-exchange column, and about 4l of a 0.1 M solution of Li$_2$CO$_3$ is passed. Next, the precipitate of the mixed hydrated niobium and zirconium oxide is discharged from the column, air-dried, then heated to the desired temperature (with a temperature increasing rate of 10 deg/min; specific temperatures are given below in Tables 1 and 2), and held at this temperature for 3 hours. As a result, a sorbent is obtained, the main fraction of which is a granule with a granule size of 0.2÷0.7 mm.

The effect of synthesis conditions in obtaining ion exchanger on its sorption properties is summarized in Table 1. This table presents results of tests of sorbents obtained at various conditions of synthesis but within the scope of the present invention. In the ion-exchange test, a solution of the following composition (g/l) is used: Li$_2$CO$_3$ —5.5; NaCl: 53.0; NaOH—3.0 (pH=12.1).

TABLE 1

Influence of synthesis conditions on compositions and properties of sorbents (synthesis under conditions within the scope of the present invention)

| The sorbent obtaining conditions | | | Test results | | | Output |
|---|---|---|---|---|---|---|
| Zr(IV):Nb(V) ration in solution during synthesis | Treatment temperature T, °C. | Sorbent composition* | Total ion exchange capacity $E_{Li0}$, mg-eqv/g | Selective capacity by Li, $E_{Li1}$, mg-eqv/g | Li—Na separation coefficient, $P_{Li,Na}$ | of the working fraction (0.2 ÷ 0.7 mm), mass % |
| 0.191 | 520 | $H_{0.98}NbO_{2.99} \cdot 0.191ZrO_2$ | 3.39 | 2.52 | 48.2 | 96 |
| 0.010 | 520 | $H_{0.19}NbO_{2.59} \cdot 0.191ZrO_2$ | 0.70 | 0.60 | 37.3 | 96 |
| 0.053 | 500 | $H_{0.38}NbO_{2.99} \cdot 0.053ZrO_2$ | 1.41 | 1.14 | 27.7 | 94 |
| 0.069 | 400 | $H_{0.94}NbO_{2.97} \cdot 0.069ZrO_2$ | 3.41 | 1.57 | 20.0 | 91 |
| 0.069 | 550 | $H_{0.39}NbO_{2.69} \cdot 0.069ZrO_2$ | 1.41 | 1.06 | 25.0 | 96 |
| 0.103 | 600 | $H_{0.35}NbO_{2.67} \cdot 0.103ZrO_2$ | 1.25 | 0.89 | 23.4 | 97 |
| 0.136 | 470 | $H_{0.80}NbO_{2.90} \cdot 0.136ZrO_2$ | 2.85 | 2.24 | 28.6 | 92 |
| 0.191 | 440 | $H_{1.04}NbO_{3.02} \cdot 0.191ZrO_2$ | 3.61 | 2.43 | 24.0 | 92 |
| 0.191 | 580 | $H_{0.75}NbO_{2.88} \cdot 0.191ZrO_2$ | 2.60 | 1.67 | 31.0 | 97 |
| 0.300 | 470 | $H_{1.05}NbO_{3.03} \cdot 0.300ZrO_2$ | 3.48 | 2.31 | 29.4 | 91 |
| 0.366 | 550 | $H_{0.91}NbO_{2.96} \cdot 0.366ZrO_2$ | 2.93 | 1.80 | 34.1 | 97 |
| 0.450 | 500 | $H_{1.05}NbO_{3.02} \cdot 0.450ZrO_2$ | 3.26 | 1.90 | 34.6 | 94 |
| 0.660 | 470 | $H_{1.10}NbO_{3.05} \cdot 0.660ZrO_2$ | 3.17 | 1.40 | 21.2 | 92 |
| 0.660 | 520 | $H_{0.91}NbO_{2.96} \cdot 0.660ZrO_2$ | 2.62 | 1.11 | 30.8 | 96 |

*The composition of the sorbent prepared for sorption of lithium (H-form)

Table 2 shows results of tests of sorbents obtained at various conditions of synthesis but beyond the scope of the present invention.

TABLE 2

Influence of synthesis conditions on the composition and properties of sorbents (synthesis under conditions beyond the scope of the present invention)

| The sorbent obtaining conditions | | | Test results | | | Output |
|---|---|---|---|---|---|---|
| Zr(IV):Nb(V) ration in solution during synthesis | Treatment temperature T, °C. | Sorbent composition* | Total ion exchange capacity $E_{Li0}$, mg-eqv/g | Selective capacity by Li, $E_{Li1}$, mg-eqv/g | Li—Na separation coefficient, $P_{Li,Na}$ | of the working fraction (0.2 ÷ 0.7 mm), mass % |
| 0.269 | 355 | $H_{1.09}NbO_{3.05} \cdot 0.269ZrO_2$ | 3.65 | 2.22 | 6.1 | 85 |
| 0.660 | 625 | $H_{0.40}NbO_{2.70} \cdot 0.660ZrO_2$ | 1.15 | 0.66 | 7.5 | 96 |
| 0.995 | 400 | $H_{1.20}NbO_{3.10} \cdot 0.995ZrO_2$ | 3.09 | 1.40 | 6.9 | 88 |
| 0.995 | 140 | $H_{1.18}NbO_{3.08} \cdot 0.995ZrO_2$ | 2.98 | 1.20 | 11.5 | 90 |
| 0.995 | 580 | $H_{0.73}NbO_{2.87} \cdot 0.995ZrO_2$ | 1.89 | 0.60 | 14.8 | 94 |

*The composition of the sorbent prepared for sorption of lithium (H-form)

It can be seen from the presented data that the total exchange capacity of the samples of the sorbents $E_{Li}$ synthesized under conditions is 2.58±0.56 mg-eqv/g; the selective lithium capacitance is $E_{Li1}$ is 1.62±0.35 mg-eqv/g; the coefficient $P_{Li,Na}$ of selectivity of the sorbent with respect to lithium reaches values of PLi, Na=30±4, and its value for the optimum composition (i.e., for the conditions within the scope of the present invention) is $P_{Li,Na}$=48. For samples obtained outside the range of optimal conditions, these values are $E_{Li0}$=2.5±1.2 mg-eqv/g, $E_{Li1}$=1.2±0.8 mg-eqv/g, and $P_{Li,Na}$=9.4±4.6. These data show that obtaining of the sorbents under optimal conditions produce great results, over both the total exchange capacity and the selective capacity of lithium. The differences between optimal and non-optimal synthesis conditions are reflected especially noticeably on coefficient $P_{Li,Na}$ of selectivity of the sorbent with respect to lithium.

The advantages of the sorbent produced by the proposed method over the prototype are given in Table 3. Lithium sorption is carried out from the solution with the above composition. The elution of lithium from the sorbent is carried out with 0.1 N $HNO_3$ solution. The table shows average results for 5 cycles of sorbent operation.

Example 2

To compare the properties of the sorbents prepared by the method of the invention and conventional methods, weights of sorbents (50 g each) are placed in ion exchange columns with parameters of 3.2 cm²×30 cm. Sorption is conducted from a solution containing (g/l): $Li_2SO_4$—5.5; NaCl—56.0; NaOH—3.0; pH=12.1.

Tests of sorbents are carried out in the following sequence. The sorbents are loaded into columns and treated with solutions of $HNO_3$ at concentration of 0.2 mol/l. The columns are then washed with water until the reaction of media became neutral, and lithium is sorbed from the solutions of the above compositions (filtration rate: 40-60 ml/h, flowing volume: 1500-1600 ml). After sorption of lithium, the columns are washed with water (300-400 ml), and ion exchangers are regenerated under the action of 0.1-0.2 mol/l of $HNO_3$. At the regeneration stage, the filtration rate is maintained at about 100 ml/h, and 800-900 ml of the solution is passed. After completion of regeneration, the columns are washed with water until the media become neutral, and a new lithium sorption cycle is started. In total, during the tests, five sorption/desorption's cycles are conducted. The averaged test results are shown in Table 3.

TABLE 3

Sorbent Test Results with Model Solutions

| Sorbent | Exchange capacity, mg-eqv/g | | Li—Na separation coefficient, | Losses per one working | Column Treated |
|---|---|---|---|---|---|
| | $E_{Li1}$ | $E_{Na1}$ | $P_{Li, Na}$ | cycle, % | Volumes |
| According to the invention | 2.45 ± 0.20 | 0.35 ± 0.03 | 49 ± 5 | 1.8 | 95 ± 8 |
| Conventional | 1.42 ± 0.20 | 0.36 ± 0.04 | 38 ± 6 | 2.1 | 51 ± 7 |

As can be seen from Table 3, the sorbent obtained according to the proposed method has sorption-selective characteristics and chemical stability more than two times higher than the sorbent obtained by the known methods.

In the second series of tests, experiments are conducted for testing a synthesized sorbent by sorption from a natural underground brine of high mineralization. The brine has the following composition (g/l): $Li^+$—0.013; $Na^+$—76.0; $K^+$—2.7; $Mg^{2+}$—3.8; $Ca^{2+}$—19.5; $NH_4^+$—0.13; $Cl^-$—154; $Br^-$—0.7; $I^-$—0.01; $SO_4^{2-}$—0.12; $HCO_3^-$—0.07; pH=8.7. Prior to desorption, the sorbent is washed with a 0.1M $NH_4Cl$ solution to remove salting-out alkaline earth ions. The desorption is conducted with a solution of 0.1N $HNO_3$.

Comparative data on the characteristics of sorbents obtained by the known and proposed methods are presented in Table 4.

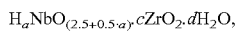

| Sorbent Test Results on Real Natural Brines | | | | | |
|---|---|---|---|---|---|
| Sorbent | Exchange capacity, mg-eqv/g | | Li—Na separation coefficient, | Losses per one working | Column Treated |
| | $E_{Li1}$ | $E_{Na1}$ | $P_{Li, Na}$ | cycle, % | Volumes |
| According to the invention | 2.55 ± 0.15 | 0.33 ± 0.08 | $(1.4 ± 0.2) \cdot 10^4$ | 1.1 | 4200 ± 200 |
| Conventional | 0.87 ± 0.11 | 0.18 ± 0.02 | $(0.9 ± 0.1) \cdot 10^4$ | 1.3 | 1800 ± 200 |

The technical and economic advantages of this method in comparison with the base object (the prototype method) are the following:
  increase in the sorption capacity for lithium and the selectivity of the sorbent to this metal in 1.8±2.0 times; and
  20-25% improvement in the operating properties of the sorbent by reducing its losses in repeated cycles of sorption and desorption.

Thus, it has be shown that the sorbent obtained by the method of the invention is suitable for industrial production of lithium by extraction from complex natural and technological brines.

The method of the invention for obtaining inorganic sorbents for extracting lithium from natural and technological brines was described with reference to specific examples of compositions and technological steps. It is understood, however, that these compositions and process steps were give only as examples and that any changes and modifications are possible within the scope of the attached patent claims. For examples, the units of the synthesis equipment may vary, depending on specific conditions. The brines may be taken from different sources. The sorbents obtained by the method of the invention may find different applications, and the synthesis of the sorbents can be conducted at different temperatures selected according to specific conditions. Various acids can be used in the method.

The invention claimed is:

1. An inorganic ion-exchanger in the form of solid particles, which comprises a non-stoichiometric compound in the form of a polymeric aqua-oxo-hydroxo complex intended for selective extraction of lithium from lithium-containing natural and industrial brines, and which is represented by the following general formula:

$H_aNbO_{(2.5+0.5 \cdot a)} \cdot cZrO_2 \cdot dH_2O$, wherein:
  "a" is a number ranging from 0.5 to 1.5,
  "c" is a number ranging from 0.01 to 1.0
  "d" is a number ranging from 0.1 to 2.0.

2. The inorganic ion-exchanger according to claim 1, wherein the polymeric aqua-oxo-hydroxo complex is a polymeric aqua-oxo-hydroxo complex of niobium and zirconium in the form of solid particles.

3. The inorganic ion-exchanger according to claim 2, wherein the polymeric aqua-oxo-hydroxo complex of niobium and zirconium is a mixed polynuclear complex.

4. The inorganic ion-exchanger according to claim 1, which has a total ion exchange capacity of at least 3.5 meq/g and an ion-exchange capacity specifically to lithium of at least 2.5 meq/g.

5. The inorganic ion-exchanger according to claim 2, which has a total ion exchange capacity of at least 3.5 meq/g and an ion-exchange capacity specifically to lithium of at least 2.5 meq/g.

6. The inorganic ion-exchanger according to claim 3, which has a total ion exchange capacity of at least 3.5 meq/g and an ion-exchange capacity specifically to lithium of at least 2.5 meq/g.

7. The inorganic ion-exchanger of claim 1, wherein the solid particles have dimensions in the range of 0.1 to 2.0 mm.

8. The inorganic ion-exchanger of claim 2, wherein the solid particles have dimensions in the range of 0.1 to 2.0 mm.

9. The inorganic ion-exchanger of claim 4, wherein the solid particles have dimensions in the range of 0.1 to 2.0 mm.

10. The inorganic ion-exchanger of claim 6, wherein the solid particles have dimensions in the range of 0.1 to 2.0 mm.

11. The inorganic ion-exchanger of claim 1 prepared by a method comprising the steps of:
    interacting a soluble niobate (V) with an acid that contains at least one zirconium (IV) thus forming a hydrated niobium (V) oxide and a hydrated zirconium (IV) oxide which co-precipitate and form a mixed hydrated niobium mixed hydrated niobium (V) and zirconium (IV) oxide (V) and zirconium (IV) oxide;
    granulating the mixed hydrated niobium (V) and zirconium (IV) oxide by freezing with subsequent defreezing thus obtaining a granulated mixed hydrated niobium (V) and zirconium (IV) oxide;
    converting the granulated mixed hydrated niobium (V) and zirconium (IV) oxide into a lithium form by treating thereof with a lithium-containing compound selected from the group consisting of an aqueous solution of lithium hydroxide and an aqueous solution of lithium carbonate;
    calcining the lithium form of the granulated mixed hydrated niobium (V) and zirconium (IV) oxide to obtain a mixed granulated tripled mixed lithium, niobium (V) and zirconium (IV) oxide which constitutes a lithium-form of the inorganic ion-exchanger; and
    converting the lithium-form of the inorganic ion-exchanger into an H-form of the inorganic ion-exchanger by treating thereof with an acid solution.

12. The inorganic ion-exchanger of claim 3 prepared by a method comprising the steps of:
    interacting a soluble niobate (V) with an acid that contains at least one zirconium (IV) thus forming a hydrated niobium (V) oxide and a hydrated zirconium (IV) oxide which co-precipitate and form a mixed hydrated niobium mixed hydrated niobium (V) and zirconium (IV) oxide (V) and zirconium (IV) oxide;
    granulating the mixed hydrated niobium (V) and zirconium (IV) oxide by freezing with subsequent defreezing thus obtaining a granulated mixed hydrated niobium (V) and zirconium (IV) oxide;
    converting the granulated mixed hydrated niobium (V) and zirconium (IV) oxide into a lithium form by treating thereof with a lithium-containing compound selected from the group consisting of an aqueous solution of lithium hydroxide and an aqueous solution of lithium carbonate;
    calcining the lithium form of the granulated mixed hydrated niobium (V) and zirconium (IV) oxide to obtain a mixed granulated tripled mixed lithium, niobium (V) and zirconium (IV) oxide which constitutes a lithium-form of the inorganic ion-exchanger; and
    converting the lithium-form of the inorganic ion-exchanger into an H-form of the inorganic ion-exchanger by treating thereof with an acid solution.

13. The inorganic ion-exchanger of claim 6 prepared by a method comprising the steps of:
    interacting a soluble niobate (V) with an acid that contains at least one zirconium (IV) thus forming a hydrated niobium (V) oxide and a hydrated zirconium (IV) oxide which co-precipitate and form a mixed hydrated niobium mixed hydrated niobium (V) and zirconium (IV) oxide (V) and zirconium (IV) oxide;
    granulating the mixed hydrated niobium (V) and zirconium (IV) oxide by freezing with subsequent defreezing thus obtaining a granulated mixed hydrated niobium (V) and zirconium (IV) oxide;
    converting the granulated mixed hydrated niobium (V) and zirconium (IV) oxide into a lithium form by treating thereof with a lithium-containing compound selected from the group consisting of an aqueous solution of lithium hydroxide and an aqueous solution of lithium carbonate;
    calcining the lithium form of the granulated mixed hydrated niobium (V) and zirconium (IV) oxide to obtain a mixed granulated tripled mixed lithium, niobium (V) and zirconium (IV) oxide which constitutes a lithium-form of the inorganic ion-exchanger; and
    converting the lithium-form of the inorganic ion-exchanger into an H-form of the inorganic ion-exchanger by treating thereof with an acid solution.

14. The inorganic ion-exchanger of claim 8 prepared by a method comprising the steps of:
    interacting a soluble niobate (V) with an acid that contains at least one zirconium (IV) thus forming a hydrated niobium (V) oxide and a hydrated zirconium (IV) oxide which co-precipitate and form a mixed hydrated niobium mixed hydrated niobium (V) and zirconium (IV) oxide (V) and zirconium (IV) oxide;
    granulating the mixed hydrated niobium (V) and zirconium (IV) oxide by freezing with subsequent defreezing thus obtaining a granulated mixed hydrated niobium (V) and zirconium (IV) oxide;
    converting the granulated mixed hydrated niobium (V) and zirconium (IV) oxide into a lithium form by treating thereof with a lithium-containing compound selected from the group consisting of an aqueous solution of lithium hydroxide and an aqueous solution of lithium carbonate;
    calcining the lithium form of the granulated mixed hydrated niobium (V) and zirconium (IV) oxide to obtain a mixed granulated tripled mixed lithium, niobium (V) and zirconium (IV) oxide which constitutes a lithium-form of the inorganic ion-exchanger; and
    converting the lithium-form of the inorganic ion-exchanger into an H-form of the inorganic ion-exchanger by treating thereof with an acid solution.

15. The inorganic ion-exchanger of claim 10 prepared by a method comprising the steps of:
    interacting a soluble niobate (V) with an acid that contains at least one zirconium (IV) thus forming a hydrated niobium (V) oxide and a hydrated zirconium (IV) oxide which co-precipitate and form a mixed hydrated niobium mixed hydrated niobium (V) and zirconium (IV) oxide (V) and zirconium (IV) oxide;

granulating the mixed hydrated niobium (V) and zirconium (IV) oxide by freezing with subsequent defreezing thus obtaining a granulated mixed hydrated niobium (V) and zirconium (IV) oxide;

converting the granulated mixed hydrated niobium (V) and zirconium (IV) oxide into a lithium form by treating thereof with a lithium-containing compound selected from the group consisting of an aqueous solution of lithium hydroxide and an aqueous solution of lithium carbonate;

calcining the lithium form of the granulated mixed hydrated niobium (V) and zirconium (IV) oxide to obtain a mixed granulated tripled mixed lithium, niobium (V) and zirconium (IV) oxide which constitutes a lithium-form of the inorganic ion-exchanger; and converting the lithium-form of the inorganic ion-exchanger into an H-form of the inorganic ion-exchanger by treating thereof with an acid solution.

* * * * *